(12) United States Patent  
Obata

(10) Patent No.: US 11,215,516 B2  
(45) Date of Patent: Jan. 4, 2022

(54) STRAIN SENSOR AND MANUFACTURING METHOD THEREFOR

(71) Applicant: Murata Manufacturing Co., Ltd., Kyoto (JP)

(72) Inventor: Takayoshi Obata, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 72 days.

(21) Appl. No.: 16/735,937

(22) Filed: Jan. 7, 2020

(65) Prior Publication Data

US 2020/0141825 A1     May 7, 2020

Related U.S. Application Data

(63) Continuation of application No. PCT/JP2018/029029, filed on Aug. 2, 2018.

(30) Foreign Application Priority Data

Aug. 10, 2017   (JP) .............................. JP2017-155713

(51) Int. Cl.  
    *G01L 1/22*      (2006.01)

(52) U.S. Cl.  
    CPC .................................. *G01L 1/2287* (2013.01)

(58) Field of Classification Search  
    CPC ...................................................... G01L 1/2287  
    See application file for complete search history.

(56) References Cited

U.S. PATENT DOCUMENTS

| | | | | |
|---|---|---|---|---|
| 5,036,286 A * | 7/1991 | Holm-Kennedy | ... | G01R 33/038 324/661 |
| 7,813,083 B2 * | 10/2010 | Guo | ...................... | G11B 5/4813 360/245.9 |
| 9,726,587 B2 * | 8/2017 | Pagani | ...................... | G01N 3/08 |

(Continued)

FOREIGN PATENT DOCUMENTS

| | | |
|---|---|---|
| EP | 0548927 A1 | 12/1992 |
| JP | H05-248925 A | 9/1993 |

(Continued)

OTHER PUBLICATIONS

International Search Report for International Application No. PCT/JP2018/029029, dated Sep. 18, 2018.

(Continued)

*Primary Examiner* — Max H Noori  
(74) *Attorney, Agent, or Firm* — Pearne & Gordon LLP

(57) ABSTRACT

Provided is a strain sensor that includes a fixing section and a measurement section that is supported by the fixing section and can expand and contract. The strain sensor includes a base material that has a first main surface and a second main surface, which face each other, and a conductor section provided on the first main surface. The conductor section includes a detection conductor that is provided in the measurement section and that has a resistance value that changes in accordance with expansion and contraction of the base material in the measurement section. The measurement section includes a detection section in which the detection conductor is provided and a low-elastic-modulus section that increases a deformation amount with respect to an external force in the detection section.

20 Claims, 7 Drawing Sheets

(56) References Cited

U.S. PATENT DOCUMENTS

| | | | |
|---|---|---|---|
| 9,766,140 B2* | 9/2017 | Hou | G01L 1/16 |
| 2006/0001863 A1 | 1/2006 | Kishida et al. | |
| 2006/0243068 A1* | 11/2006 | Ueno | F16C 19/184 |
| | | | 73/862.322 |
| 2009/0301176 A1* | 12/2009 | Rowe | G01Q 60/38 |
| | | | 73/64.53 |
| 2009/0301215 A1 | 12/2009 | McDearmon et al. | |
| 2010/0251834 A1 | 10/2010 | Maeda et al. | |
| 2019/0391003 A1* | 12/2019 | Lustenberger | G01G 3/16 |

FOREIGN PATENT DOCUMENTS

| | | |
|---|---|---|
| JP | H07-243805 A | 9/1995 |
| JP | H08-114408 A | 5/1996 |
| JP | H10-332559 A | 12/1998 |
| JP | 2009-539116 A | 11/2009 |
| JP | 2016-170123 A | 9/2016 |
| JP | 2017-075847 A | 4/2017 |
| WO | 02/052236 A1 | 7/2002 |
| WO | 2004/048889 A1 | 6/2004 |
| WO | 2009/084539 A1 | 7/2009 |

OTHER PUBLICATIONS

Written Opinion for International Application No. PCT/JP2018/029029, dated Sep. 18, 2018.

* cited by examiner

STRAIN SENSOR AND MANUFACTURING METHOD THEREFOR

This is a continuation of International Application No. PCT/JP2018/029029 filed on Aug. 2, 2018 which claims priority from Japanese Patent Application No. 2017-155713 filed on Aug. 10, 2017. The contents of these applications are incorporated herein by reference in their entireties.

BACKGROUND

Technical Field

The present disclosure relates to a strain sensor and a manufacturing method therefor.

In recent years, strain sensors have been used in motion detection, control, and so forth of bodies and robots. For example, paragraph 0003 of Patent Document 1 discloses that a strain sensor in which carbon nanotubes (CNT) are used as a resistor material can be used in motion detection, control, and so forth of a body or a robot by installing the strain sensor in various electronic devices such as a data glove worn on a person's hand, a wearable device that can be worn directly on the body, and joint driving parts of robots (paragraph 0003 of Patent Document 1).

Patent Document 1: Japanese Unexamined Patent Application Publication No. 2016-170123

BRIEF SUMMARY

However, the strain sensor of the related art is manufactured for the purpose of detecting strain generated due to a relatively large stress in a rigid object such as a joint driving part of a robot, and the applications thereof are limited. For example, in the case where strain on the skin surface of a human body, which has low elasticity, is to be detected, since the skin surface has low elasticity, the strain sensor itself restrains the strain and it is difficult to realize accurate strain detection with the strain sensor of the related art.

Accordingly, the present disclosure provides a strain sensor that can detect strain produced due to a low-elasticity property and provides a method of manufacturing the strain sensor.

In order to solve the above problem, an aspect of the present disclosure provides a strain sensor that includes a fixing section, a measurement section that is supported by the fixing section and can expand and contract, a base material that has a first main surface and a second main surface, which face each other, and a conductor section provided on the first main surface. The conductor section includes a detection conductor that is provided in the measurement section and that has a resistance value that changes in accordance with expansion and contraction of the base material in the measurement section. The measurement section includes a detection section in which the detection conductor is provided and a low-elastic-modulus section that increases a deformation amount with respect to an external force in the detection section.

As a result of the measurement section including the low-elastic-modulus section, compared with a strain sensor of the related art, the thus-configured strain sensor can detect a strain generated due to a low-elasticity property.

According to a certain aspect of the present disclosure, in the strain sensor, the low-elastic-modulus section is provided so as to be separate from the detection section.

As a result of the measurement section including the low-elastic-modulus section, compared with a strain sensor of the related art, the thus-configured strain sensor can detect a strain generated due to a low-elasticity property.

According to a certain aspect of the present disclosure, in the strain sensor, the low-elastic-modulus section includes a plurality of slits that are provided in a direction that intersects an expansion/contraction direction of the detection conductor.

As a result of the low-elastic-modulus section including a plurality of slits provided in a direction that intersects the expansion/contraction direction of the detection conductor, compared with a strain sensor of the related art, the thus-configured strain sensor can detect a strain generated by a low-elasticity property with a simple configuration.

According to a certain aspect of the present disclosure, in the strain sensor, the low-elastic-modulus section is provided between the detection section and the fixing section.

As a result of the low-elastic-modulus section being provided between the detection section and the fixing section in the thus-configured strain sensor, a large force can be prevented from acting on the detection section and damaging of the detection section can be suppressed.

According to a certain aspect of the present disclosure, in the strain sensor, the low-elastic-modulus section includes a first low-elastic-modulus section that includes some of the plurality of slits and a second low-elastic-modulus section that includes some of the plurality of slits.

As a result of the low-elastic-modulus section including the first low-elastic-modulus section and the second low-elastic-modulus section, the elastic modulus of the measurement section can be reduced and the thus-configured strain sensor can detect a strain generated due to a low-elasticity property with high accuracy.

According to a certain aspect of the present disclosure, in the strain sensor, the detection section is provided between the first low-elastic-modulus section and the second low-elastic-modulus section.

As a result of the detection section being provided between the first low-elastic-modulus section and the second low-elastic-modulus section, the thus-configured strain sensor can detect a strain generated by a low-elasticity property with higher accuracy.

According to a certain aspect of the present disclosure, in the strain sensor, the slits provided in the first low-elastic-modulus section and the slits provided in the second low-elastic-modulus section are provided in a symmetrical manner in equal numbers and a length that is a sum of slit lengths of two symmetrically provided slits is greater than or equal to 40% of a width of the measurement section.

As a result of the length that is a sum of the slit lengths of two symmetrically provided slits being greater than or equal to 40% of the width of the measurement section, the elastic modulus can be more effectively reduced by the slits in the thus-configured strain sensor.

According to a certain aspect of the present disclosure, in the strain sensor, the fixing section includes a first fixing section and a second fixing section, and the measurement section is positioned between the first fixing section and the second fixing section.

As a result of the measurement section being positioned between the first fixing section and the second fixing section, the thus-configured strain sensor can detect strain in the measurement section with high sensitivity without necessarily being affected by parts outside the measurement section.

According to a certain aspect of the present disclosure, in the strain sensor, the detection section includes a plurality of radial detection sections that are provided in a radiating manner, the low-elastic-modulus section includes a plurality of fan-shaped low-elastic-modulus sections provided between adjacent radial detection sections, and the detection conductor is provided in the radial detection sections.

As a result of including a plurality of radial detection sections and a plurality of fan-shaped low-elastic-modulus sections and the detection conductor being provided in the radial detection sections, the thus-configured strain sensor can detect strain in a direction perpendicular to the surface of the base material with high sensitivity.

According to a certain aspect of the present disclosure, in the strain sensor, the plurality of fan-shaped low-elastic-modulus sections include a plurality of slits that are provided in directions that intersect expansion/contraction directions of the detection conductors.

As a result of the strain sensor including a plurality of slits that are provided in directions that intersect the expansion/contraction directions of the provided detection conductors, the thus-configured strain sensor can detect strain in a direction perpendicular to the surface of the base material with high sensitivity.

According to a certain aspect of the present disclosure, in the strain sensor, the plurality of slits are provided such that slit lengths thereof increase with increasing distance from centers of the fan-shaped low-elastic-modulus sections.

As a result of the plurality of slits being provided such that the slit lengths thereof increase with increasing distance from centers of the fan-shaped low-elastic-modulus sections in the thus-configured strain sensor, the elastic moduli of the entire fan-shaped low-elastic-modulus sections can be uniformly decreased and the strain sensor can detect strain in a direction perpendicular to the surface of the base material with higher sensitivity.

According to a certain aspect of the present disclosure, in the strain sensor, the conductor section includes a wiring conductor that is connected to the detection conductor and is provided in the fixing section.

As a result of the conductor section including a wiring conductor that is provided in the fixing section, a change in resistance in the wiring conductor can be decreased and the thus-configured strain sensor can detect a change in the resistance of the detection conductor with high accuracy.

According to a certain aspect of the present disclosure, the strain sensor includes a plurality of the measurement sections.

As a result of the thus-configured strain sensor including a plurality of measurement sections, strain can be detected in a plurality of locations.

According to a certain aspect of the present disclosure, in the strain sensor, part of the wiring conductor connected to the detection conductor formed in one measurement section is formed in another measurement section, and a change in a resistance value of the detection conductor formed in the one measurement section is calculated on the basis of a change in a resistance value of the detection conductor formed in the other measurement section.

As a result of part of the wiring conductor being formed in the other measurement section, the thus-configured strain sensor enables a small-sized strain sensor that includes a plurality of measurement sections to be provided.

According to a certain aspect of the present disclosure, in the strain sensor, the plurality of measurement sections includes at least two measurement sections that have different expansion/contraction directions from each other.

As a result of the thus-configured strain sensor including at least two measurement sections having different expansion/contraction directions from each other, the strain sensor is able to detect strain in different expansion/contraction directions in different locations.

According to a certain aspect of the present disclosure, in the strain sensor, the plurality of measurement sections includes at least two measurement sections that have identical expansion/contraction directions.

As a result of the thus-configured strain sensor including at least two measurement sections having identical expansion/contraction directions, it is possible to detect strain in different locations in the same expansion/contraction direction.

According to a certain aspect of the present disclosure, in the strain sensor, the fixing section includes a restraining part that restrains expansion and contraction of the base material.

As a result of the fixing section including the restraining part that restrains expansion and contraction of the base material, the thus-configured strain sensor can increase the sensitivity with which strain is detected.

According to a certain aspect of the present disclosure, the detection conductor includes a metal powder and a resin.

As a result of the detection conductor including a metal powder and a resin, the thus-configured strain sensor can increase the sensitivity with which strain is detected.

According to a certain aspect of the present disclosure, the strain sensor includes an adhesive layer on the second main surface of the base material.

As a result of an adhesive layer being provided on the second main surface of the base material, the thus-configured strain sensor can be easily fixed to an object to be detected.

An aspect of the present disclosure provides a method of manufacturing a strain sensor including a fixing section and a measurement section that is supported by the fixing section and can expand and contract, the method including: a step of preparing a base material that has a first main surface and a second main surface, which face each other, a step of forming a conductor section that includes a detection conductor on the first main surface of the base material, and a step of forming a low-elastic-modulus section in part of the measurement section excluding a detection section of the base material.

According to the above-described method of manufacturing a strain sensor, a strain sensor can be manufactured that can detect a strain generated due to a low-elasticity property.

According to a certain aspect of the present disclosure, in the method of manufacturing a strain sensor, a plurality of slits are formed in the part of the measurement section excluding the detection section of the base material in the step of forming the low-elastic-modulus section.

According to the above-described method of manufacturing a strain sensor, a strain sensor can be manufactured that can detect a strain generated due to a low-elasticity property with higher accuracy.

According to a certain aspect of the present disclosure, the method of manufacturing a strain sensor further includes a step of forming resin, which has a higher hardness than the base material, in the fixing section.

According to the above-described method of manufacturing a strain sensor, a strain sensor can be manufactured that can detect a strain generated due to a low-elasticity property with higher accuracy.

According to the present disclosure, there can be provided a strain sensor that can detect strain produced due to a low-elasticity property and a method of manufacturing the strain sensor.

DETAILED DESCRIPTION

Figure 1:
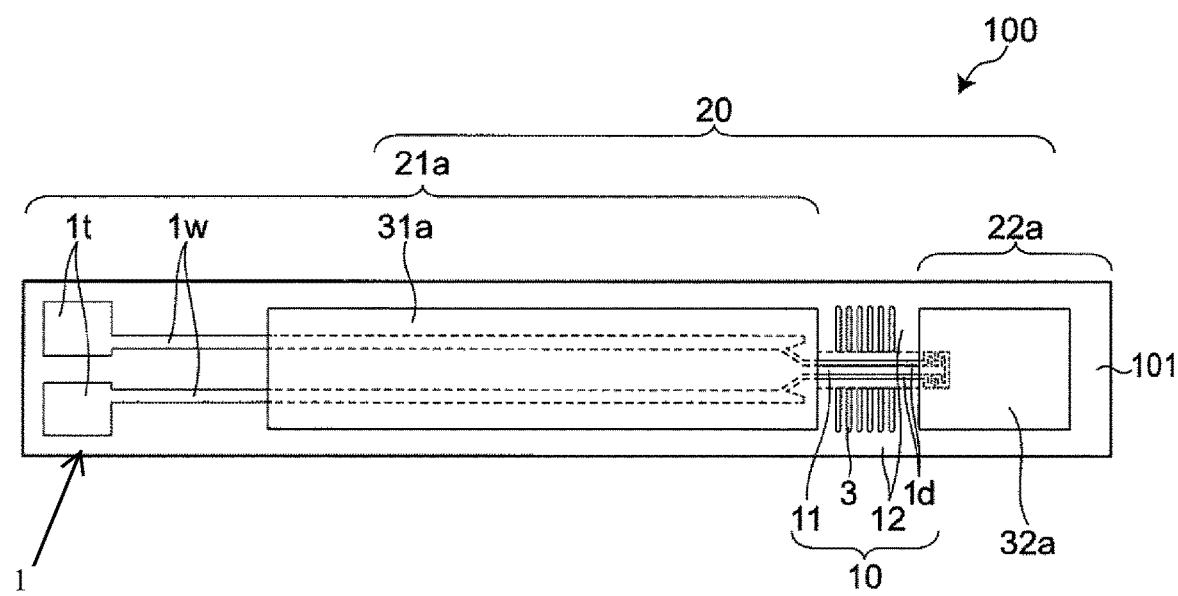
FIG. 1 is a plan view illustrating the configuration of a strain sensor of embodiment 1 according to the present disclosure.

The inventors of the present disclosure had the aim of realizing a strain sensor capable of detecting strain generated as a result of a small stress acting due to a low-elasticity property and investigated the potential demand (need) for the detection of such a strain. As a result, it was clear that there is a need to detect deformations such as local blistering of human skin in medical settings. Accordingly, the inventors of the present disclosure carried out intensive studies in order to realize a strain sensor that can detect, for example, local blistering and swelling of human skin, and thereby arrived at the present disclosure. Here, in order to be able to detect local blistering and swelling of human skin, the elastic modulus of the part that measures the strain is required to be sufficiently lower than the elastic modulus of human skin. Specifically, the elastic modulus of human skin is around 7 MPs in the stratum corneum and around 3.4 MPs in the dermis and therefore the elastic modulus of a measurement section of a strain sensor described hereafter is set to 3 MPs, which is sufficiently lower than these values, and can be set to be less than or equal to 2 MPs.

Hereafter, strain sensors according to embodiments of the present disclosure will be described while referring to the drawings.

Embodiment 1

A strain sensor 100 of embodiment 1 includes a fixing section 20 and a measurement section 10 that is supported by the fixing section 20 and can expand and contract. As illustrated in FIG. 1, in the strain sensor 100 of embodiment 1, the fixing section 20 includes a first fixing section 21a and a second fixing section 22a, and the measurement section 10 is arranged between the first fixing section 21a and the second fixing section 22a.

In addition, the strain sensor 100 of embodiment 1 includes a base material 101 that has a first main surface and a second main surface, which face each other, and a conductor section 1, which is provided on the first main surface of the base material 101. The constituent material of the base material 101 can be an elastic material having a low elastic modulus, and for example, can include an elastic material having a low elastic modulus such as polyurethane, acrylic, or silicone resin.

The conductor section 1 includes two connection terminal conductors 1t that are provided at positions spaced apart from the measurement section 10 on the first main surface of the first fixing section 21a, two wiring conductors 1w that extend in the same direction (hereafter referred to as first direction) from the connection terminal conductors 1t, and detection conductors 1d consisting of two conductors that extend in the first direction from leading end portions of the wiring conductors 1w and are narrower than the wiring conductors 1w. Here, in the strain sensor 100 of embodiment 1, the two connection terminal conductors 1t, the two wiring conductors 1w, and the two detection conductors 1d are symmetrically arranged with respect to a center line extending in the first direction. Furthermore, the two connection terminal conductors 1t and the two wiring conductors 1w are provided on the first main surface in the first fixing section 21a, the detection conductors 1d are provided on the first main surface in the measurement section 10, and a connection conductor that connects leading end parts of the detection conductors 1d to each other is provided on the first main surface in the second fixing section 22a. In this way, a detection circuit is formed in which the two detection conductors 1d are serially connected with each other between the two connection terminal conductors 1t. In the detection circuit, the resistance value of the detection conductors 1d changes in response to changes in the lengths of the detection conductors 1d in the first direction (expansion direction) or changes in the cross sectional areas of the detection conductors 1d in accordance expansion/contraction of the base material of the measurement section 10. Changes in the resistance values of the detection conductors 1d are detected as a change in current value between the two connection terminal conductors 1t, and as a result, the expansion/contraction amount of the base material 101 of the measurement section 10, i.e., strain can be detected.

In the conductor section 1, the constituent material of the detection conductors 1d can be a material in which the resistance value changes markedly with expansion and contraction and for example the constituent material can be a mixed material consisting of a metal powder such as silver (Ag) or copper (Cu) and an elastomer-based resin such as silicone. When the detection conductors 1d are formed of a mixed material consisting of a metal powder and a resin, the number of contact points between the metal powder particles increases or decreases and the distance between metal powder particles increases with expansion or contraction of the base material, and therefore the percentage increase or decrease of the resistance value with respect to deformation can be increased. Furthermore, by forming the detection conductors 1d of a mixed material consisting of a metal powder and a resin, it is possible to prevent breaking of the detection conductors 1d caused by deformation of the base material due to the elasticity of the resin.

The constituent material of the parts of the conductor section 1 other than the detection conductors 1d may be the same constituent material as the detection conductors 1d or may be a different constituent material from the detection conductors 1d. If the parts of the conductor section 1 other than the detection conductors 1d are formed of the same material as the detection conductors 1d, the detection conductors 1d and the parts of the conductor section 1 other than the detection conductors 1d can be formed together in one step, and therefore a reduction in cost can be achieved. In addition, in the case where the parts of the conductor section 1 other than the detection conductors 1d are formed of a different material from the detection conductors 1d, the parts of the conductor section 1 other than the detection conductors 1d can be formed of a material having a low resistance while the detection conductors 1d can be formed so that the increase or decrease in the resistance value thereof with respect to deformation is large and so that breaking of the detection conductors 1d due to expansion/contraction is prevented.

Hereafter, specific configurations of the measurement section 10 and the fixing section 20 will be described in detail.

<Measurement Section 10>

The measurement section 10 is a region that is for measuring changes in the shape of an object to be measured. The outer dimensions of the measurement section 10 are set while considering the area of the measurement target region and the following performance of the measurement section 10 is set while considering the flexibility of the object to be measured. Regarding the following performance of the measurement section 10, for example, the following performance is increased by giving the measurement section 10 a shape and structure that deforms more easily than the surrounding region by making cuts (slits) or holes in the base material 101 in the measurement section 10 or reducing the thickness of the base material, for example.

In the strain sensor 100 of embodiment 1, as illustrated in FIG. 1, the measurement section 10 includes a detection section 11, in which the detection conductors 1d are provided, and a low-elastic-modulus section 12 that is formed so as not to restrain deformation in the detection section 11 due to strain and so as not to restrain deformation of the object to be measured. Specifically, in the strain sensor 100 of embodiment 1, the detection section 11 is formed so as to have a small width so as to be able to elastically deform and follow the strain of the object to be measured in accordance with expansion and contraction of the measurement target without necessarily restraining the expansion and contraction of the measurement target. In the strain sensor 100 of embodiment 1, the detection section 11 is formed so that the length thereof in the first direction is larger than the width thereof in a direction perpendicular to the first direction, and the two detection conductors 1d can be arranged side by side and close to each other parallel to the first direction in the detection section 11. By forming the detection section 11 in this way, the ratio of expansion/contraction of the detection conductors 1d in the expansion/contraction direction can be increased. Here, in this specification, "low elastic modulus" used when referring to the low elastic modulus of the low-elastic-modulus section and when the elastic modulus of the low-elastic-modulus section is reduced means that the elastic modulus of the low-elastic-modulus section is lower than that of the fixing section. The low-elastic-modulus section can have a lower elastic modulus than the measurement target region of the object to be measured and easily deforms, and the elastic modulus of the low-elastic-modulus section can be less than or equal to $\frac{1}{2}$ and can be less than or equal to $\frac{1}{3}$ the elastic modulus of the measurement target region of the object to be measured.

The low-elastic-modulus section 12 is provided on both sides of the detection section 11. The low-elastic-modulus section 12 includes a plurality of slits 3 that are provided in a direction that intersects and can be perpendicular to the expansion/contraction direction of the detection conductors 11d. Thus, the low-elastic-modulus section 12 expands and contracts in accordance with expansion and contraction of the object to be measured without necessarily restraining expansion and contraction of the object to be measured and without necessarily restraining expansion and contraction of the detection section 11. The thus-configured measurement section 10 allows the entire measurement section 10 to deform in accordance with changes in the shape of the object to be measured without necessarily constraining changes in the shape of the object to be measured such as blistering of human skin and is able to detect strain in the target measurement region of the object to be measured by detecting expansion and contraction that occurs together with changes in the shape of the object to be measured using the detection section 11.

Furthermore, the silt length (length in expansion/contraction direction of slits, here, length in direction perpendicular to first direction) of the slits 3 formed in the low-elastic-modulus section 12 can be set so that a length that is the sum of the lengths of two slits 3 formed in the direction perpendicular to the first direction (total slit length) is greater than or equal to 40% or can be greater than or equal to 60% of the width of the measurement section 10. When slits are formed so that the total slit length is greater than or equal to 40%, the same amount of strain can be obtained with a tensile load of about $\frac{2}{3}$ as compared with the case where the slits are not formed, and when the slits are formed so that the total slit length is greater than or equal to 60%, the same amount of strain can be obtained with about half the tensile load as compared with the case where the slits are not formed.

<Fixing Section 20>

The fixing section 20 is for allowing the entire strain sensor to be fixed to the surface of the object to be measured by affixing the second main surface of the base material 101 to the surface of the object to be measured. The fixing section 20 supports the measurement section 10 such that the measurement section 10 expands and contracts in accordance with expansion and contraction of the measurement target region of the object to be measured when the measurement target region expands and contracts. In the strain sensor 100 of embodiment 1, the fixing section 20 includes a first fixing section 21a and a second fixing section 22a. The first fixing section 21a and the second fixing section 22a are provided on both sides of the measurement section 10 in the expansion/contraction direction of the detection conductors 1d. The fixing section 20 can include a restraining part so that, when the measurement target region of the object to be measured expands and contracts, strain corresponding to the expansion and contraction in the measurement target region can be detected without necessarily being affected by expansion and contraction occurring in a region outside the measurement target region. As illustrated in FIG. 1, the restraining part includes a first restraining part 31a that is provided in the first fixing section 21a and a second restraining part 32a that is provided in the second fixing section 22a. Furthermore, the first restraining part 31a and the second restraining part 32a can be provided close to the measurement section 10. Thus, the strain in the measurement target region of the object to be measured can be accurately measured by reducing the influence of parts outside the measurement target region.

The thus-configured strain sensor 100 of embodiment 1 includes the measurement section 10 that can expand and contract in accordance with strain generated due to a low-elasticity property, and therefore the strain sensor 100 is able to detect strain in a region having a small amount of deformation such as blistering of human skin.

Furthermore, the detection conductors forming the detection section 11 of the measurement section 10 of the strain sensor 100 of embodiment 1 are formed of a mixed material consisting of a metal powder and a resin, and therefore the percentage increase or decrease of the resistance value with respect to deformation can be increased and a small strain can be detected with high sensitivity.

In addition, since the strain sensor 100 of embodiment 1 includes the first restraining part 31a and the second restraining part 32a, the strain in the measurement target region of the object to be measured can be accurately measured by reducing the effect from parts outside the measurement target region.

Embodiment 2

Figure 2:
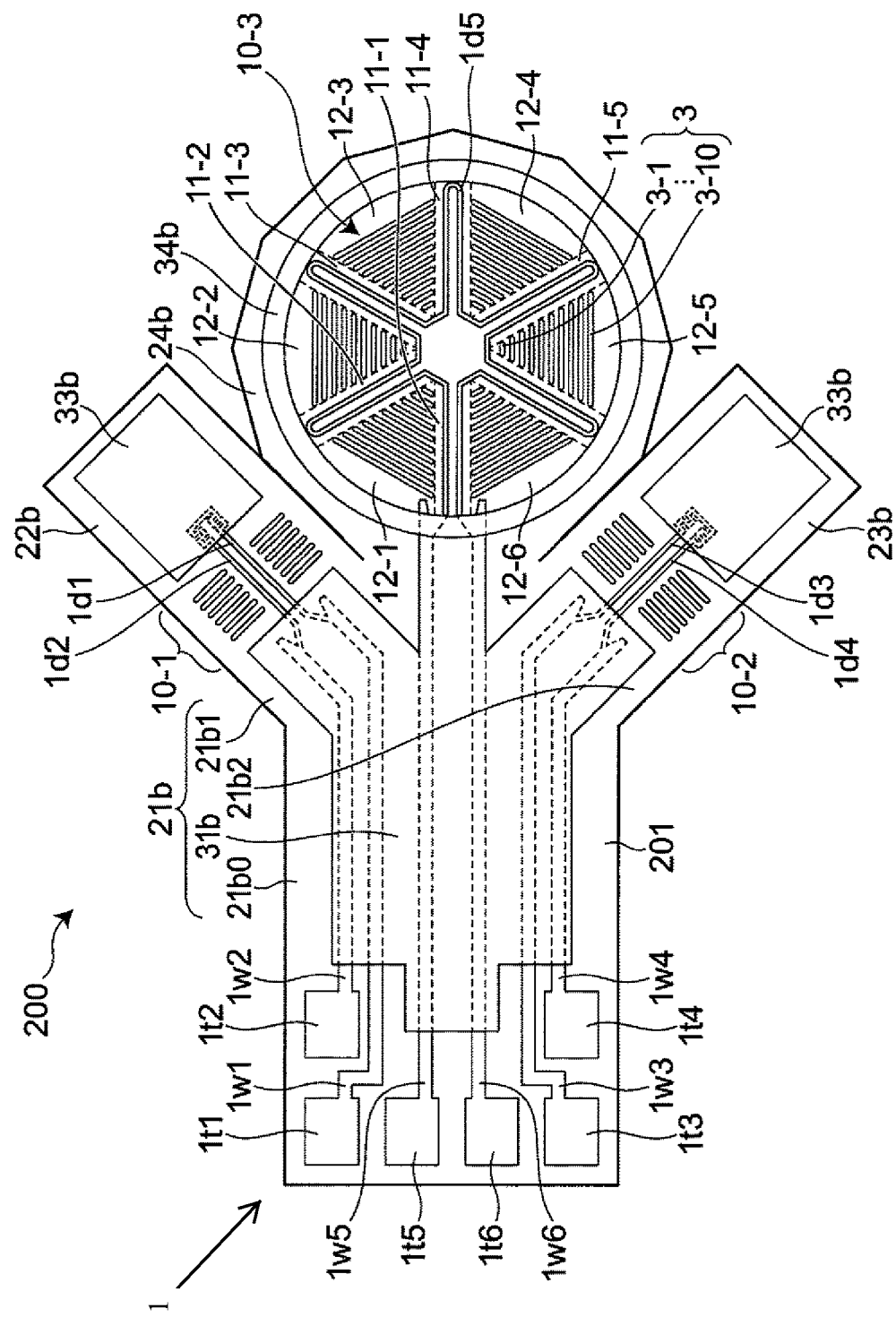
FIG. 2 is a plan view illustrating the configuration of a strain sensor of embodiment 2 according to the present disclosure.

As illustrated in FIG. 2, a strain sensor 200 of embodiment 2 is a strain sensor that includes three measurement sections consisting of a first measurement section 10-1, a second measurement section 10-2, and a third measurement section 10-3. Here, the first measurement section 10-1 and the second measurement section 10-2 are provided to mainly detect strain produced by planar expansion and contraction and the third measurement section 10-3 is provided to mainly detect strain produced by three-dimensional expansion and contraction.

Hereafter, the strain sensor 200 of embodiment 2 will be described in detail.

The strain sensor 200 of embodiment 2 includes a fixing section 21b, a second fixing section 22b, a third fixing section 23b, and a fourth fixing section 24b as fixing sections. Here, the first fixing section 21b includes a base fixing part 21b0, a first branch fixing part 21b1 that extends from the base fixing part 21b0 in the first direction, and a second branch fixing part 21b2 that extends from the base fixing part 21b0 in a second direction that is perpendicular to the first direction. Furthermore, the fourth fixing section 24b is formed in an annular shape.

Then, the first measurement section 10-1 is provided between the first branch fixing part 21b1 and the second fixing section 22b, the second measurement section 10-2 is provided between the second branch fixing part 21b2 and the third fixing section 23b, and the third measurement section 10-3 is provided inside the annular fourth fixing section 24b. Here, the third measurement section 10-3 provided inside the fourth fixing section 24b mainly detects strain in a direction perpendicular to the first direction and the second direction, i.e., the height direction, and the detailed configuration thereof will be described later.

In addition, similarly to embodiment 1, the strain sensor 200 of embodiment 2 is configured to include a base material 201 having a first main surface and a second main surface, which face each other, and a conductor section that is provided on the first main surface of the base material 201. However, the shape of the base material 201 and the pattern configuration of the conductor section are different from those in embodiment 1.

The base material 201 includes a base part that corresponds to the base fixing part 21b0, a first branch part that extends from the base part in the first direction from the base part, a second branch part that extend from the base part in the second direction that is perpendicular to the first direction, and a circular part that is interposed between the first branch part and the second branch part and has a substantially circular shape. In embodiment 2, the circular part is provided so that the center thereof is located on a center axis of the base part. The first branch fixing part 21b1, the first measurement section 10-1, and the second fixing section 22b are provided on the first branch part. The second branch fixing part 21b2, the second measurement section 10-2, and the third fixing section 23b are provided on the second branch part. The fourth fixing section 24b and the third measurement section 10-3 are provided on the circular part. The constituent material of the base material 201 can be an elastic material having a low elastic modulus, and for example, can include an elastic material having a low elastic modulus such as polyurethane, acrylic, or silicone resin, similarly to as in embodiment 1.

The conductor section includes six first to sixth connection terminal conductors 1t1 to 1t6 on a first main surface of the base fixing part 21b0 (base part of base material 201). The first to sixth connection terminal conductors 1t1 to 1t6 are provided at positions on the opposite side from the first branch fixing part 21b1 and the second branch fixing part 21b2 on the first main surface of the base fixing part 21b0.

The conductor section also includes first to sixth wiring conductors 1w1 to 1w6 that respectively extend from the first to sixth connection terminal conductors 1t1 to 1t6.

The first and second wiring conductors 1w1 and 1w2 are provided so as to be adjacent and parallel to each other and are provided so as to extend from the base fixing part 21b0 to the first branch fixing part 21b1. The third and fourth wiring conductors 1w3 and 1w4 are provided so as to be adjacent and parallel to each other and are provided so as to extend from the base fixing part 21b0 to the second branch fixing part 21b2. The fifth and sixth wiring conductors 1w5 and 1w6 are provided so as to be adjacent and parallel to each other and are provided so as to extend from the base fixing part 21b0 to the fourth fixing section 24b.

The conductor section further includes first to fifth detection conductors 1d1 to 1d5 that respectively extend from leading end parts of the first to sixth wiring conductors 1w1 to 1w6. The first to fifth detection conductors 1d1 to 1d5 are formed so as to have a smaller width the first to sixth wiring conductors 1w1 to 1w6. The first and second detection conductors 1d1 and 1d2 are provided in the first measurement section 10-1 and the leading end parts thereof are connected to each other in the second fixing section 22b. The third and fourth detection conductors 1d3 and 1d4 are provided in the second measurement section 10-2 and the leading end parts thereof are connected to each other in the third fixing section 23b.

The fifth detection conductor 1d5 has one end that is connected to the fifth wiring conductor 1w5 and another end that is connected to the sixth wiring conductor 1w6, and is provided in the third measurement section 10-3 as will be described in detail later.

The constituent material of the conductor section 1 is the same as in the strain sensor of embodiment 1.

As described above, a first detection circuit is formed in which the detection conductors 1d1 and 1d2 are serially connected between the first and second connection terminal conductors 1t1 and 1t2. In the first detection circuit, the resistance values of the detection conductors 1d1 and 1d2 change in response to changes in the lengths of the detection conductors $1d1$ and $1d2$ in the first direction in accordance with expansion/contraction of the base material of the first measurement section 10-1. The changes in the resistance values of the detection conductors $1d1$ and $1d2$ are detected as a change in current value between the first and second connection terminal conductors $1t1$ and $1t2$, and as a result, the expansion/contraction amount, i.e., the strain of the base material of the first measurement section 10-1 can be detected.

In addition, a second detection circuit is formed in which the detection conductors $1d3$ and $1d4$ are serially connected between the second and third connection terminal conductors $1t3$ and $1t4$. In the second detection circuit, the resistance values of the detection conductors $1d3$ and $1d4$ change in response to changes in the lengths of the detection conductors $1d3$ and $1d4$ in the second direction in accordance with expansion/contraction of the base material of the second measurement section 10-2. The changes in the resistance values of the detection conductors $1d3$ and $1d4$ are detected as a change in current value between the third and fourth connection terminal conductors $1t3$ and $1t4$, and as a result, the expansion/contraction amount, i.e., the strain of the base material of the second measurement section 10-2 can be detected.

In the strain sensor of embodiment 2, the configurations of the first measurement section 10-1 and the second measurement section 10-2 are the same as that of the measurement section 10 in the strain sensor of embodiment 1.

Accordingly, hereafter, the description will focus on the configuration of the third measurement section 10-3, which is different from in embodiment 1.

<Third Measurement Section 10-3>

The third measurement section 10-3 is provided inside the annular fourth fixing section 24b, and as described above, mainly detects strain in a direction perpendicular to the first direction and the second direction.

The third measurement section 10-3 is a region that is located inside the annular fourth fixing section 24b and is for measuring changes in the shape of an object to be measured. The third measurement section 10-3 includes a plurality of (six) fan-shaped low-elastic-modulus sections 12-1 to 12-6 and detection sections 11-1 to 11-6 that are composed of a plurality of (six) radial regions that are located between adjacent low-elastic-modulus sections and extend in a radiating manner from the center of the third measurement section 10-3. The detection sections 11-1 to 11-6 are formed such that the lengths thereof in the radial direction of the measurement section 10-3 are larger than the widths thereof in a direction perpendicular to the radial direction, and as a result, the detection sections 11-1 to 11-6 are able to undergo elastic deformation in accordance with expansion and contraction of the measurement target without necessarily restricting the expansion and contraction of the measurement target. One end of the fifth detection conductor $1d5$ is connected to the fifth wiring conductor $1w5$, the fifth detection conductor $1d5$ is extends to the detection section 11-1 and meanders back and forth in the detection sections 11-2 to 11-6, and then the other end of the fifth detection conductors $1d5$ is connected to the sixth wiring conductor $1w6$.

The plurality of low-elastic-modulus sections 12-1 to 12-6, each includes a plurality of, for example, ten slits 3-1 to 3-10. The plurality of slits 3-1 to 3-10 are formed in each low-elastic-modulus section so that the centers of the slits 3-1 to 3-10 are located on a center line that bisects a center angle of the fan shape and so that the expansion/contraction directions thereof are perpendicular to the center line. Furthermore, in each of the low-elastic-modulus sections 12-1 to 12-6, the plurality of slits 3-1 to 3-10 are formed so that the slit lengths of the slits 3-1 to 3-10 (lengths in the direction perpendicular to the center line) increase with increasing distance from the center toward the outer side of the fan shape. Thus, the low-elastic-modulus sections 12-1 to 12-6 expand and contract in accordance with expansion and contraction of the object to be measured without necessarily restricting expansion and contraction of the object to be measured and without necessarily restricting expansion and contraction of the detection sections 11-1 to 11-6. In addition, the plurality of slits 3-1 to 3-10 can be formed such that the intervals between the end portions of the slits 3-1 to 3-10 and the fifth wiring conductor $1w5$ adjacent to those end portions are identical. In this embodiment, the third measurement section 10-3 is configured to include six low-elastic-modulus sections, but it is sufficient for the third measurement section 10-3 to include at least two or more low-elastic-modulus sections, and the slits are not limited to being formed in a straight line shape and may instead be formed in a circular arc shape.

<Fourth Fixing Section 24b>

The fourth fixing section 24b is provided in an annular shape around the third measurement section 10-3 and the second main surface of the base material 201 in the fourth fixing section 24b is affixed to the surface of the object to be measured, thereby fixing the periphery of the third measurement section 10-3 in place. The fourth fixing section 24b supports the measurement section 10 in such a manner that the third measurement section 10-3 expand and contracts in accordance with the expansion and contraction of the measurement target region of the object to be measured when the measurement target region of the object to be measured expands and contracts. The fourth fixing section 24b can include a restraining part 34b so that, when the measurement target region of the object to be measured expands and contracts, strain corresponding to the expansion and contraction in the measurement target region can be detected without necessarily being affected by expansion and contraction occurring in a region outside the measurement target region. As illustrated in FIG. 2, the restraining part 34b can be provided around the third measurement section 10-3, close to the third measurement section 10-3. Thus, the strain in the measurement target region of the object to be measured can be accurately measured by reducing the influence of parts outside the measurement target region.

The thus-configured strain sensor 200 of embodiment 2 includes the first measurement section 10-1, the second measurement section 10-2, and the third measurement section 10-3 that can each expand and contract in accordance with strain generated due to a low-elasticity property, and therefore the strain sensor 200 is able to detect the strain in regions having a small amount of deformation such as blistering of human skin.

In the thus-configured strain sensor 200 of embodiment 2, the first measurement section 10-1 has high sensitivity to expansion and contraction in the first direction and the second measurement section 10-2 has high sensitivity to expansion and contraction in the second direction, and the third measurement section 10-3 has high sensitivity to expansion and contraction in a direction perpendicular to the first direction and the second direction, that is, in a direction perpendicular to the first main surface of the base material 201. The arrangement of the first measurement section 10-1 and the second measurement section 10-2 is not limited to the first measurement section 10-1 and the second measurement section 10-2 being arranged at positions so as to be perpendicular to each other, and strain can be measured with good sensitivity in each measurement section by attaching the strain sensor 200 so that the first measurement section 10-1, the second measurement section 10-2, and the third measurement section 10-3 are appropriately arranged in accordance with the main expansion/contraction direction of the measurement target region of the object to be measured. With this configuration, the values of strain can be detected in three XYZ directions in an object to be measured and the shape of the deformation causing the strain can be estimated by combining these values of strain.

Strain Sensor 200M1 of Modification 1 of Embodiment 2

Figure 3:
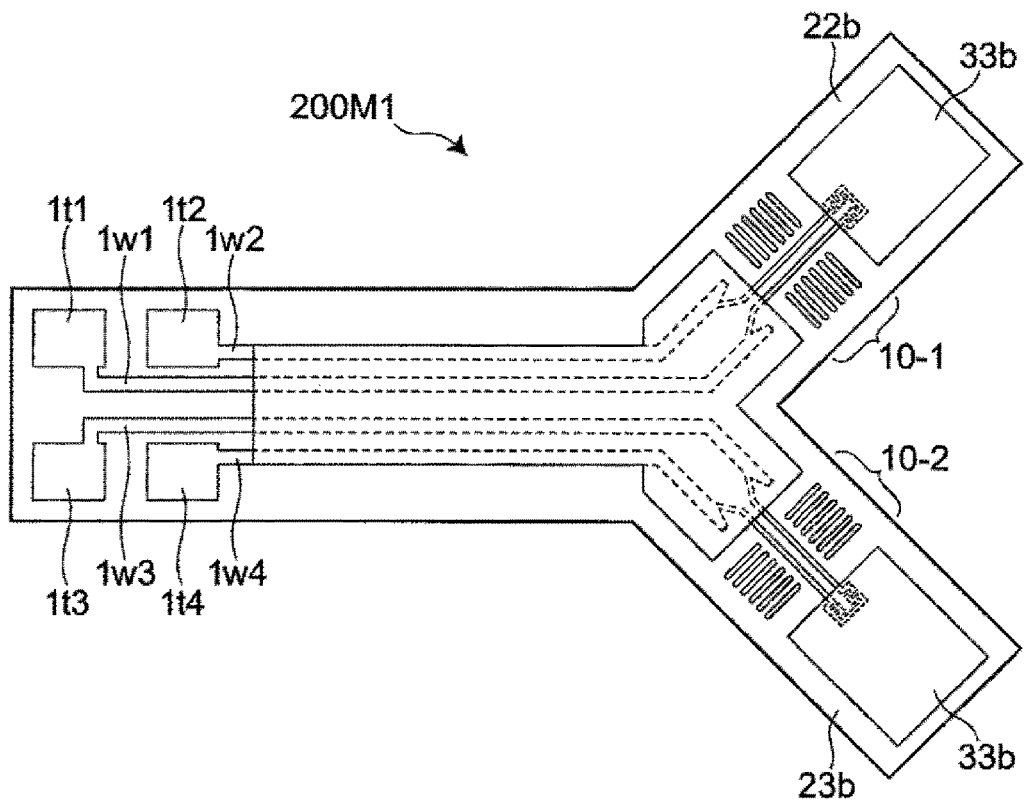
FIG. 3 is a plan view illustrating the configuration of a strain sensor of modification 1 of embodiment 2.

FIG. 3 is a plan view illustrating the configuration of a strain sensor 200M1 of modification 1 of embodiment 2. As illustrated in FIG. 3, the configuration of the strain sensor 200M1 of modification 1 is the same as that of the strain sensor 200 of embodiment 2 except that the third measurement section 10-3 of the strain sensor 200 of embodiment 2 is omitted. According to the strain sensor 200M1 of modification 1 of embodiment 2, a strain sensor having high sensitivity to expansion and contraction in the first direction and the second direction can be provided at a lower cost than the strain sensor of embodiment 2.

Strain Sensor 200M2 of Modification 2 of Embodiment 2

Figure 4:
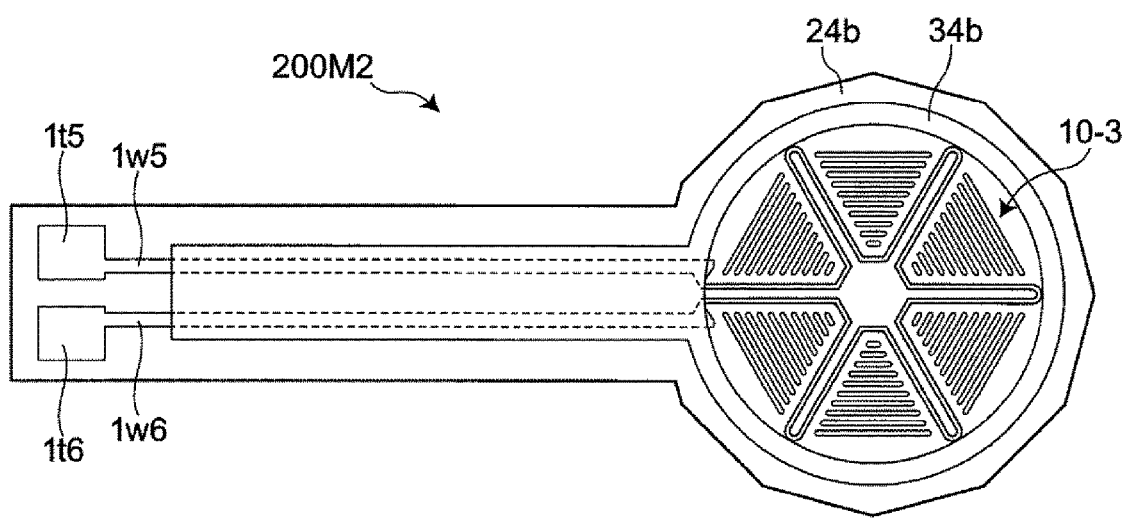
FIG. 4 is a plan view illustrating the configuration of a strain sensor of modification 2 of embodiment 2.

FIG. 4 is a plan view illustrating the configuration of a strain sensor 200M2 of modification 2 of embodiment 2. As illustrated in FIG. 4, the configuration of the strain sensor 200M2 of modification 2 is the same as that of the strain sensor 200 of embodiment 2 except that the first measurement section 10-1 and the second measurement section 10-2 of the strain sensor 200 of embodiment 2 are omitted. According to the strain sensor 200M2 of modification 2 of embodiment 2, a strain sensor having high sensitivity to expansion and contraction in a direction perpendicular to the first direction and the second direction can be provided at a lower cost than the strain sensor of embodiment 2.

Embodiment 3

A strain sensor 300 of embodiment 3 has the same configuration as the strain sensor 100 of embodiment 1 except that the configuration of a measurement section 10a is different from in the strain sensor 100 of embodiment 1.

Figure 5:
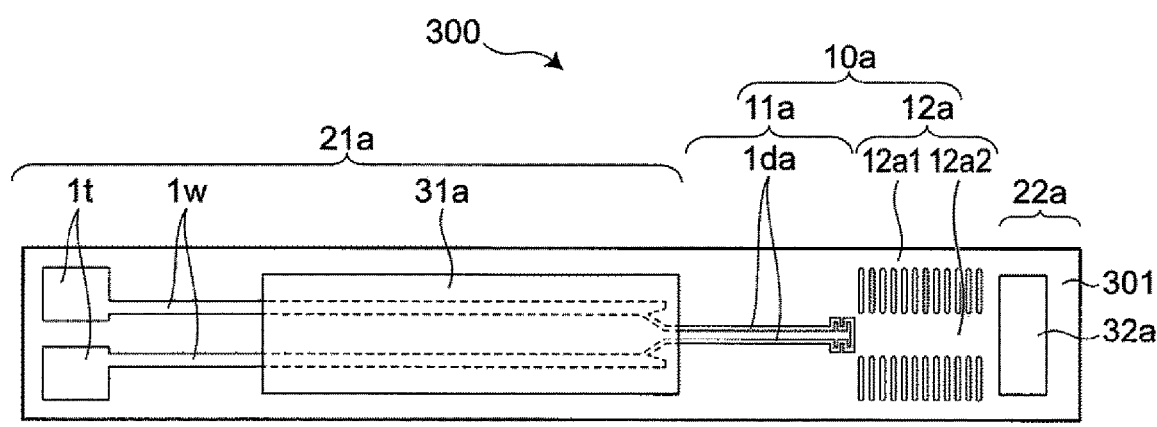
FIG. 5 is a plan view illustrating the configuration of a strain sensor of embodiment 3 according to the present disclosure.

Hereafter, the specific configuration of the measurement section 10a that is different from in embodiment 1 will be described while referring to FIG. 5.

<Measurement Section 10a>

In the strain sensor 300 of embodiment 3, the measurement section 10a is more suitable for detecting a strain that is accompanied by a large deformation and for which the force generating the strain is large compared with the strain sensor of embodiment 1. Specifically, in the strain sensor 300 of embodiment 3, as illustrated in FIG. 5, the measurement section 10a includes a detection section 11a, which is provided with detection conductors 1da, and a low-elastic-modulus section 12a, and the low-elastic-modulus section 12a is arranged between the detection section 11a and the second fixing section 22a.

In the strain sensor 300 of embodiment 3, the low-elastic-modulus section 12a includes a first low-elastic-modulus section 12a1 and a second low-elastic-modulus section 12a2 that are symmetrically arranged about a center line extending in a first direction, which is the direction in which the detection conductors 1da extend. The first low-elastic-modulus section 12a1 and the second low-elastic-modulus section 12a2, each includes a plurality of slits having a length in a direction perpendicular to the first direction that is larger than the width thereof in the first direction. The thus-configured low-elastic-modulus section 12a (first low-elastic-modulus section 12a1 and second low-elastic-modulus section 12a2) has a larger expansion/contraction ratio in the first direction than the detection section 11a.

In the measurement section 10a of the thus-configured strain sensor 300 of embodiment 3, the low-elastic-modulus section 12a, which has a large expansion/contraction ratio, deforms more than the detection section 11a when the entire measurement section 10a undergoes a large deformation, and therefore breaking of the detection conductors 1da formed in the detection section 11a can be prevented. In addition, the detection section 11a can be formed to have a larger width than the detection section 11a of the strain sensor 100 of embodiment 1, and breaking of the detection conductors 1da can be prevented more effectively. Thus, as a result of the low-elastic-modulus section 12a, which can elastically deform by a large amount, being arranged between the detection section 11a and the second fixing section 22a, the strain sensor 300 of embodiment 3 can detect strain without necessarily the detection conductors 1da breaking when a large deformation is generated in the measurement section 10a.

For example, when the initial length (length when no strain is acting) of the mixed material consisting of a metal and a resin forming the detection conductors 1da is taken to be 100%, in the case where a deformation of up to around 120% to 130% is possible for the mixed material, deformation of the entire measurement section 10a can reach around 160% to 190% for example while deformation of the detection section 11a is suppressed to 120% to 130% and a large deformation of 160% to 190% can be detected. In the strain sensor 300 of embodiment 3, the ratio of the area of the low-elastic-modulus section 12a with respect to the detection section 11a, the slit length, silt width and the number of slits of the low-elastic-modulus section 12a are appropriately set while considering the estimated maximum deformation amount (strain amount) in the measurement target region of the object to be measured, and consequently a strain sensor can be provided that is suitable for the measurement target region of the object to be measured that is a target.

In addition, the strain sensor 300 of embodiment 3 is formed of a mixed material consisting of a metal powder and a resin, and therefore the percentage increase or decrease of the resistance value with respect to deformation can be increased and a small strain can be detected with good sensitivity.

Furthermore, since the strain sensor 300 of embodiment 3 includes the first restraining part 31a and the second restraining part 32a, the strain in the measurement target region of the object to be measured can be accurately measured by reducing the effect from parts outside the measurement target region.

In the present disclosure, in the strain sensor of embodiment 2 (including the strain sensor of modification 1 of embodiment 2), the first measurement section 10-1 and/or the second measurement section 10-2 may have the same configuration as the measurement section 10a of embodiment 3.

Embodiment 4

Figure 6:
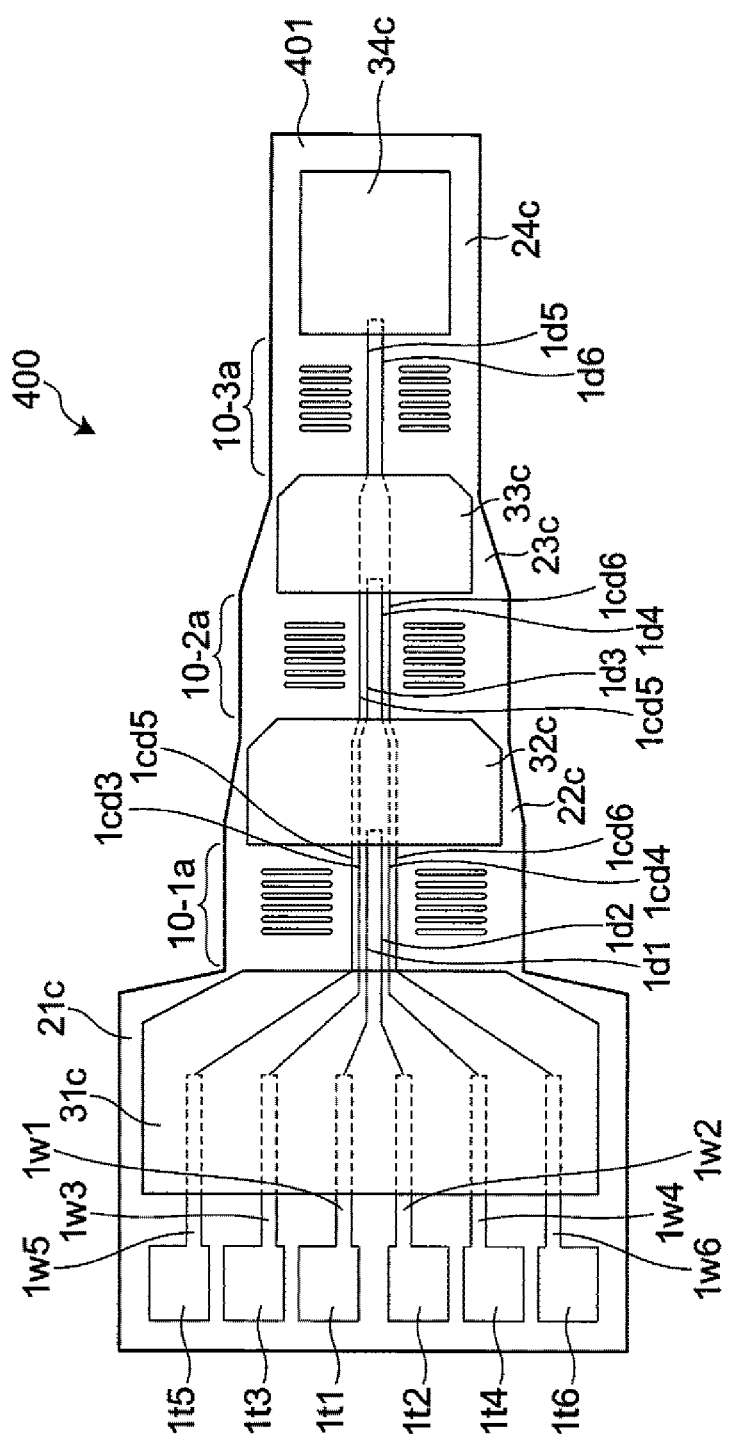
FIG. 6 is a plan view illustrating the configuration of a strain sensor of embodiment 4 according to the present disclosure.

As illustrated in FIG. 6, a strain sensor 400 of embodiment 4 is a strain sensor in which fixing sections and measurement sections are provided in an alternating manner in the first direction, and the strain sensor 400 includes four fixing sections consisting of a first fixing section 21*c*, a second fixing section 22*c*, a third fixing section 23*c*, and a fourth fixing section 24*c* and three measurement sections consisting of a first measurement section 10-1*a*, a second measurement section 10-2*a*, and a third measurement section 10-3*a*. In the strain sensor 400 of embodiment 4, the first measurement section 10-1*a* is provided between the first fixing section 21*c* and the second fixing section 22*c*, the second measurement section 10-2*a* is provided between the second fixing section 22*c* and the third fixing section 23*c*, and the third measurement section 10-3*a* is provided between the third fixing section 23*c* and the fourth fixing section 24*c*. In addition, similarly to the other embodiments, the strain sensor 400 of embodiment 4 is configured to include a base material 401 having a first main surface and a second main surface, which face each other, and a conductor section that is provided on the first main surface of the base material 401.

Hereafter, the strain sensor 400 of embodiment 4 will be described in detail while referring to FIG. 6.

In the strain sensor 400 of embodiment 4, the first fixing section 21*c* includes first to sixth connection terminal conductors 1*t*1 to 1*t*6. In this case, the first and second connection terminal conductors 1*t*1 and 1*t*2 are on the inside closest to a center line extending in the first direction, the third and fourth connection terminal conductors 1*t*3 and 1*t*4 are provided outside of those connection terminal conductors, and the fifth and sixth connection terminal conductors 1*t*5 and 1*t*6 are provided outermost. In the first fixing section 21*c*, the first to sixth wiring conductors 1*w*1 to 1*w*6 respectively extend in the first direction from the first to sixth connection terminal conductors 1*t*1 to 1*t*6 and are then routed so as to converge near the center line so that the leading ends thereof are close to each other but separated from each other at the boundary between the first fixing section 21*c* and the first measurement section 10-1*a*.

The first and second detection conductors 1*d*1 and 1*d*2, which are for detecting the strain of the first measurement section 10-1*a*, are provided between the first and second connection terminal conductors 1*t*1 and 1*t*2, the third and fourth detection conductors 1*d*3 and 1*d*4, which are for detecting the strain of the second measurement section 10-2*a*, are provided between the third and fourth connection terminal conductors 1*t*3 and 1*t*4, and the fifth and sixth detection conductors 1*d*5 and 1*d*6, which are for detecting strain of the third measurement section 10-3*a*, are provided between the fifth and sixth connection terminal conductors 1*t*5 and 1*t*6, as described below.

The first and second detection conductors 1*d*1 and 1*d*2 extend from the leading ends of the first and second wiring conductors 1*w*1 and 1*w*2, are provided in the first measurement section 10-1*a*, and the leading end parts thereof are connected to each other in the second fixing section 22*c*. The third detection conductor 1*d*3 is provided in the second measurement section 10-2*a* via a third conductor 1*cd*3 that extends from the leading end of the third wiring conductor 1*w*3 and is provided in the first measurement section 10-1*a* and a connection conductor that extends from the leading end of the third conductor 1*cd*3 and is provided in the second fixing section 22*c*. The fourth detection conductor 1*d*4 is provided in the second measurement section 10-2*a* via a fourth conductor 1*cd*4 that extends from the leading end of the fourth wiring conductor 1*w*4 and is provided in the first measurement section 10-1*a* and a connection conductor that extends from the leading end of the fourth conductor 1*cd*4 and is provided in the second fixing section 22*c*. The leading end part of the third detection conductor 1*d*3 and the leading end part of the fourth detection conductor 1*d*4 are connected to each other in the third fixing section 23*c*.

The fifth detection conductor 1*d*5 is provided in the third measurement section 10-3*a* via a fifth conductor 1*cd*5 that extends from the leading end of the fifth wiring conductor 1*w*5 and is provided in the first measurement section 10-1*a*, a connection conductor that extends from the leading end of the fifth conductor 1*cd*5 and is provided in the second fixing section 22*c*, a fifth conductor 1*cd*5*a* that extends from the leading end of that connection conductor and is provided in the second measurement section 10-2*a*, and a connection conductor that extends from the leading end of the fifth conductor 1*cd*5*a* and is provided in the third fixing section 23*c*.

The sixth detection conductor 1*d*6 is provided in the third measurement section 10-3*a* via a sixth conductor 1*cd*6 that extends from the leading end of the sixth wiring conductor 1*w*6 and is provided in the first measurement section 10-1*a*, a connection conductor that extends from the leading end of the sixth conductor 1*cd*6 and is provided in the second fixing section 22*c*, a sixth conductor 1*cd*6*a* that extends from the leading end of that connection conductor and is provided in the second measurement section 10-2*a*, and a connection conductor that extends from the leading end of the sixth conductor 1*cd*6*a* and is provided in the third fixing section 23*c*.

The leading end part of the fifth detection conductor 1*d*5 and the leading end part of the sixth detection conductor 1*d*6 are connected to each other in the fourth fixing section 24*c*. Here, the resistance values of the connection conductors formed in the fixing sections substantially do not change with strain.

As described above, a first detection circuit is formed that is for detecting the strain of the first measurement section 10-1 and in which the first detection conductor 1*d*1 and the second detection conductor 1*d*2 are serially connected between the first and second connection terminal conductors 1*t*1 and 1*t*2.

A second detection circuit is formed that is for detecting the strain of the second measurement section 10-2*a* in which the third conductor 1*cd*3, the third detection conductor 1*d*3, the fourth detection conductor 1*d*4, and the fourth conductor 1*cd*4 are serially connected between the third and fourth connection terminal conductors 1*t*3 and 1*t*4.

A third detection circuit is formed that is for detecting the strain in the third measurement section 10-3*a* and in which the fifth conductor 1*cd*5, the fifth conductor 1*cd*5*a*, the fifth detection conductor 1*d*5, the sixth detection conductor 1*d*6, the sixth conductor 1*cd*6*a*, and the sixth conductor 1*cd*6 are serially connected between the fifth and sixth connection terminal conductors 1*t*5 and 1*t*6.

Here, in the first detection circuit, since the change in resistance value between the first and second connection terminal conductors 1*t*1 and 1*t*2 is the change in resistance value of the first detection conductor 1*d*1 and the second detection conductor 1*d*2, the strain in the first measurement section 10-1*a* can be detected from the change in resistance value between the first and second connection terminal conductors 1*t*1 and 1*t*2.

However, the second detection circuit and the third detection circuit, in addition to including the third detection conductor 1*d*3 and the fourth detection conductor 1*d*4 and the fifth detection conductor 1*d*5 and the sixth detection conductor 1*d*6, which are for detecting strain in the respective measurement sections, also include the third conductor 1*cd*3, the fourth conductor 1*cd*4, the fifth conductor 1*cd*5, the fifth conductor 1cd5a, the sixth conductor 1cd6a, and the sixth conductor 1cd6, which are formed in the other measurement sections and whose resistance values change with the strain in those measurement sections.

Therefore, in the second detection circuit and the third detection circuit, it is necessary to calculate the change in resistance value in the third detection conductor 1d3 and the fourth detection conductor 1d4 or the change in resistance value in the fifth detection conductor 1d5 and the sixth detection conductor 1d6 in the measurement section that is the target of detection by removing changes in resistance value in conductors formed in measurement sections other than the detection target measurement section.

Various methods for removing the changes in resistance values occurring in conductors formed in measurement sections other than the detection target measurement section in the second detection circuit and the third detection circuit can be considered, but the following method is sufficient.

For example, regarding the second detection circuit, the third conductor 1cd3 and the fourth conductor 1cd4 provided in the first measurement section 10-1a are given the same configurations as the first and second detection conductors 1d1 and 1d2 of the first detection circuit. "Same configuration" means that the conductors are formed in the same shape and using the same material as the first and second detection conductors 1d1 and 1d2. As a result, changes in the resistance values of the third conductor 1cd3 and the fourth conductor 1cd4 are substantially the same as changes in the resistance values of the first and second detection conductors 1d1 and 1d2.

Therefore, a change in the resistance value of the third detection conductor 1d3 and the fourth detection conductor 1d4 in the second detection circuit can be calculated by subtracting a change in the resistance value of the first and second detection conductors 1d1 and 1d2 detected in the first detection circuit from a change in the resistance value of the second detection circuit between the third and fourth connection terminal conductors 1t3 and 1t4.

Similarly, regarding the third detection circuit, it is sufficient to give the fifth conductor 1cd5 and the sixth conductor 1cd6 provided in the first measurement section 10-1a the same configuration as the first and second detection conductors 1d1 and 1d2 of the first detection circuit and to give the fifth conductor 1cd5a and the sixth conductor 1cd6a provided in the second measurement section 10-2a the same configuration as the third detection conductor 1d3 and the fourth detection conductor 1d4 of the second detection circuit. With this configuration, a change in the resistance value of the fifth detection conductor 1d5 and the sixth detection conductor 1d6 in the third detection circuit can be calculated by subtracting a change in the resistance value of the first and second detection conductors 1d1 and 1d2 detected in the first detection circuit and a change in the resistance value of the third detection conductor 1d3 and the fourth detection conductor 1d4 in the second detection circuit from a change in the resistance value of the third detection circuit between the fifth and sixth connection terminal conductors 1t5 and 1t6.

The thus-configured strain sensor of embodiment 4 is capable of differentially measuring strain in a plurality of detection target regions for a relatively narrow detection target, and for example, is capable of detecting blistering or swelling at a plurality of locations on a person's finger.

In the strain sensor of embodiment 4, the first fixing section 21c, the second fixing section 22c, the third fixing section 23c, and the fourth fixing section 24c respectively can include a first restraining part 31c, a second restraining part 32c, a third restraining part 33c, and a fourth restraining part 34c so that, when the measurement target region of the object to be measured expands and contracts, strain corresponding to the expansion and contraction in the measurement target region can be detected without necessarily being affected by expansion and contraction in a region outside the measurement target region.

Embodiment 5

Figure 7:
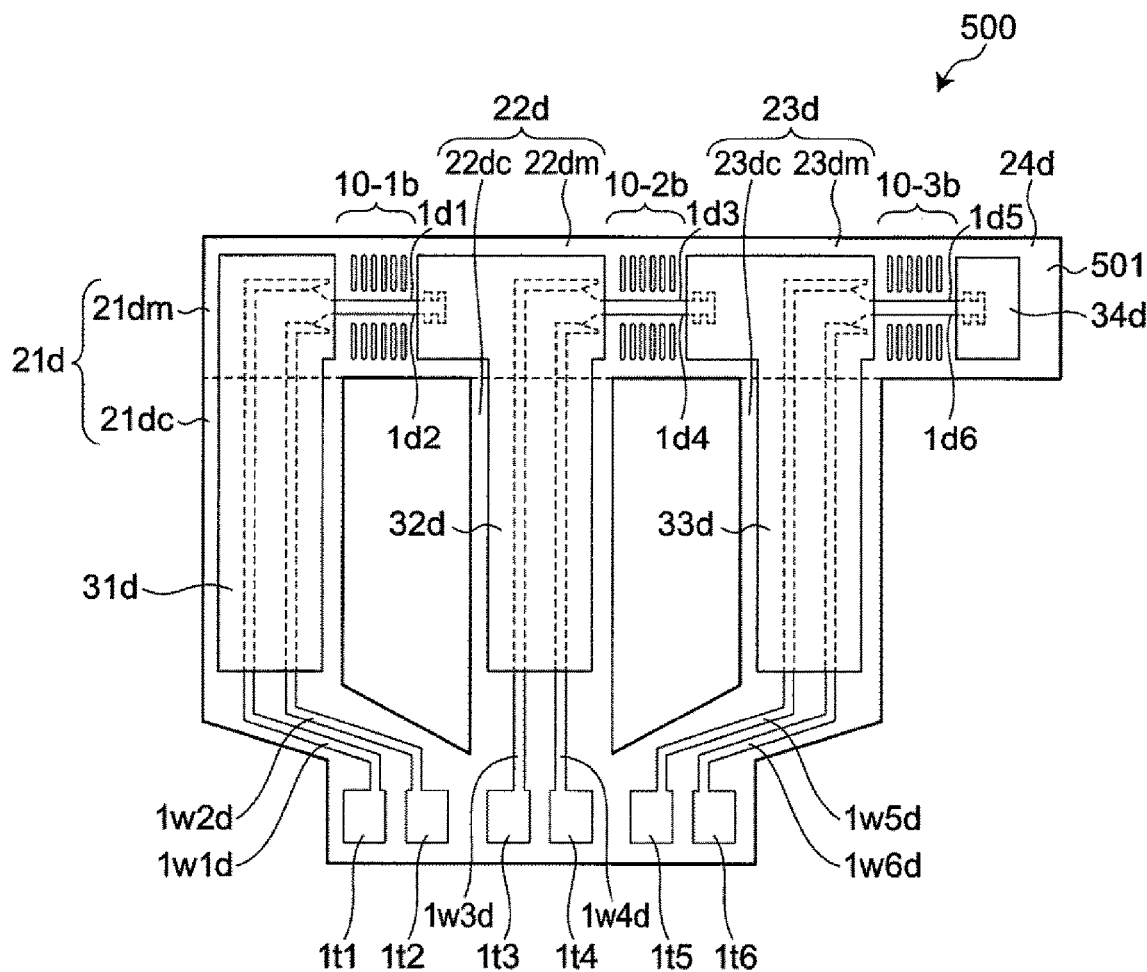
FIG. 7 is a plan view illustrating the configuration of a strain sensor of embodiment 5 according to the present disclosure.

As illustrated in FIG. 7, a strain sensor 500 of embodiment 5 is a strain sensor in which fixing sections and measurement sections are provided in an alternating manner in the first direction, and the strain sensor 500 includes four fixing sections consisting of a first fixing section 21d, a second fixing section 22d, a third fixing section 23d, and a fourth fixing section 24d and three measurement sections consisting of a first measurement section 10-1b, a second measurement section 10-2b, and a third measurement section 10-3b. In the strain sensor 500 of embodiment 5, the first measurement section 10-1b is provided between the first fixing section 21d and the second fixing section 22d, the second measurement section 10-2b is provided between the second fixing section 22d and the third fixing section 23d, and the third measurement section 10-3b is provided between the third fixing section 23d and the fourth fixing section 24d. In addition, similarly to the other embodiments, the strain sensor 500 of embodiment 5 is configured to include a base material 501 having a first main surface and a second main surface, which face each other, and a conductor section that is provided on the first main surface of the base material 501.

As described above, the strain sensor 500 of embodiment 5 is the same as the strain sensor 400 of embodiment 4 in that the fixing sections and the measurement sections are provided in an alternating manner in the first direction, but the shapes of three fixing sections other than the fourth fixing section 24d, namely, the first fixing section 21d, the second fixing section 22d, and the third fixing section 23d are different from the shapes of the first to third fixing sections 21c, 22c, and 23c in embodiment 4. Specifically, in the strain sensor 500 of embodiment 5, the first fixing section 21d, the second fixing section 22d, and the third fixing section 23d respectively include a first wiring fixing part 21dc, a second wiring fixing part 22dc, and a third wiring fixing part 23dc that extend in a direction perpendicular to the first direction. In the following description, the parts of the first fixing section 21d, the second fixing section 22d, and the third fixing section 23d other than the first wiring fixing part 21dc, the second wiring fixing part 22dc, and the third wiring fixing part 23dc will be respectively referred to as a first measurement fixing part 21dm, a second measurement fixing part 22dm, and a third measurement fixing part 23dm.

Hereafter, the strain sensor 500 of embodiment 5 will be described in detail while referring to FIG. 7.

In the first fixing section 21d of embodiment 5, the first wiring fixing part 21dc includes the first connection terminal conductor 1t1 and the second connection terminal conductor 1t2 at an end portion thereof on the opposite side from the first measurement fixing part 21dm. first and second wiring conductors 1w1d and 1w2d respectively extend from the first and second connection terminal conductors 1t1 and 1t2 in a direction perpendicular to the first direction in the first wiring fixing part 21dc and are then are routed so as to be bent in the first direction in the first measurement fixing part 21dm.

The second wiring fixing part 22*dc* includes the third connection terminal conductor 1*t*3 and the fourth connection terminal conductor 1*t*4 at an end portion thereof on the opposite side from the second measurement fixing part 22*dm*. third and fourth wiring conductors 1*w*3*d* and 1*w*4*d* respectively extend from the third and fourth connection terminal conductors 1*t*3 and 1*t*4 in a direction perpendicular to the first direction in the second wiring fixing part 22*dc* and are then are routed so as to be bent in the first direction in the second measurement fixing part 22*dm*.

The third wiring fixing part 23*dc* includes the fifth connection terminal conductor 1*t*5 and the sixth connection terminal conductor 1*t*6 at an end portion thereof on the opposite side from the third measurement fixing part 23*dm*. fifth and sixth wiring conductors 1*w*5*d* and 1*w*6*d* respectively extend from the fifth and sixth connection terminal conductors 1*t*5 and 1*t*6 in a direction perpendicular to the first direction in the third wiring fixing part 23*dc* and are then are routed so as to be bent in the first direction in the third measurement fixing part 23*dm*.

The first and second detection conductors 1*d*1 and 1*d*2 extend from the leading ends of the first and second wiring conductors 1*w*1*d* and 1*w*2*d*, are provided in the first measurement section 10-1*b*, and the leading end parts thereof are connected to each other in the second fixing section 22*d*.

The third and fourth detection conductors 1*d*3 and 1*d*4 extend from the leading ends of the third and fourth wiring conductors 1*w*3*d* and 1*w*4*d*, are provided in the second measurement section 10-2*b*, and the leading end parts thereof are connected to each other in the third fixing section 23*d*.

The fifth and sixth detection conductors 1*d*5 and 1*d*6 extend from the leading ends of the fifth and sixth wiring conductors 1*w*5*d* and 1*w*6*d*, are provided in the third measurement section 10-3*b*, and the leading end parts thereof are connected to each other in the fourth fixing section 24*d*.

As described above, a first detection circuit is formed that is for detecting the strain of the first measurement section 10-1*b* and in which the first and second detection conductors 1*d*1 and 1*d*2 are serially connected between the first and second connection terminal conductors 1*t*1 and 1*t*2.

In addition, a second detection circuit is formed that is for detecting the strain of the second measurement section 10-2*b* and in which the third and fourth detection conductors 1*d*3 and 1*d*4 are serially connected between the third and fourth connection terminal conductors 1*t*3 and 1*t*4.

In addition, a third detection circuit is formed that is for detecting the strain of the third measurement section 10-3*b* and in which the fifth and sixth detection conductors 1*d*5 and 1*d*6 are serially connected between the fifth and sixth connection terminal conductors 1*t*5 and 1*t*6.

The thus-configured strain sensor of embodiment 4 is capable of differentially measuring strain in a plurality of detection target regions.

In the strain sensor of embodiment 5, the first fixing section 21*d*, the second fixing section 22*d*, the third fixing section 23*d*, and the fourth fixing section 24*d* respectively can include a first restraining part 31*d*, a second restraining part 32*d*, a third restraining part 33*d*, and a fourth restraining part 34*d* so that, when the measurement target region of the object to be measured expands and contracts, strain corresponding to the expansion and contraction in the measurement target region can be detected without necessarily being affected by expansion and contraction in a region outside the measurement target region.

In the above-described strain sensors of embodiments 1 to 5, the elastic modulus of entire measurement sections is reduced by low-elastic-modulus sections provided separately from detection sections such as slits and for example it is possible to detect strain generated due to a low-elasticity property such as strain that accompanies blistering of skin.

However, the present disclosure is not limited to this configuration, and rather than forming low-elastic-modulus sections, for example, the elastic modulus of the measurement sections may be reduced by reducing the thickness of the base material in the measurement sections compared to the fixing sections or by reducing the width of the measurement sections compared to the fixing sections. In addition, in a strain sensor of the present disclosure, the elastic modulus of the measurement sections may be reduced in the low-elastic-modulus sections by providing a plurality of through holes or by forming concave portions in a groove shape or a dot shape instead of providing slits. In the present specification, a "low-elastic-modulus section" may also be realized by reducing the elastic modulus of a measurement section as a whole by reducing the thickness of the base material in the measurement section compared with the fixing section or reducing the width of the measurement section compared with the fixing section.

Hereafter, a method of manufacturing the strain sensors of embodiments 1 to 5 will be described.

<Preparation and Processing of Base Material>

First, for example, a base material composed of a resin such as polyurethane that has a low elastic modulus and high elasticity is prepared.

The prepared base material is processed into the shapes of the strain sensors of embodiments 1 to 5. This shaping process is carried out by performing, for example, die cutter processing, press processing, laser processing, or the like.

Silts are formed in each measurement section of the base material that has been subjected to shaping processing. The slits are formed by performing, for example, laser processing, die cutter processing, punching, or the like.

<Formation of Conductor Section>

The conductor section including the connection terminal conductors, the wiring conductors, and the detection conductors is formed on the first main surface (upper surface), which has been shape processed. The pattern shape of the conductor section can be formed by performing screen printing, using a dispenser, or the like, and for example, in the case where the conductor section is formed using a conductor paste formed by dispersing a metal powder in a resin, after the pattern is formed, the resin is cured using heat, for example. Depending on the resin, curing may be performed using a moisture treatment.

In addition, as described above, the conductor section may be formed by using different conductive materials for the connection terminal conductors, the wiring conductors, and the detection conductors in accordance with the functions thereof.

<Formation of Restraining Parts>

A resin that is given a higher elastic modulus by being curing, for example, a urethane-modified acrylic resin or the like is formed in predetermined patterns at predetermined locations on the fixing sections and cured. The resin may be cured by, for example, performing heating, moisture curing, or UV curing depending on the type of resin.

An adhesive layer is formed on the second main surface of the base material of the fixing sections as necessary after or prior to the above-described steps.

The strain sensors of embodiments 1 to 5 can be manufactured in the manner described above.

EXAMPLES

<Evaluation of Silts in Relation to Elastic Modulus>

Strain sensors of examples were manufactured and the manner in which the elastic modulus of the substrate changed depending on the shape of the slits was evaluated.

Figure 8:
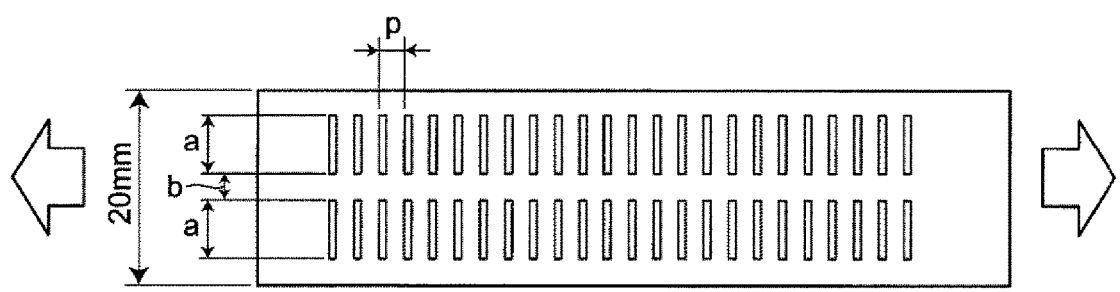
FIG. 8 is a plan view of an evaluation sample manufactured to confirm the effect of slits formed in the restraining part of a strain sensor according to the present disclosure.

In this evaluation, a rectangular base material composed of thermoplastic polyurethane having a width of 20 mm, a length of 50 mm, and a thickness of 40 μm was prepared. As illustrated in FIG. 8, ten different evaluation samples S1 to S10 were manufactured in which a first slit group and a second slit group, each including twenty-four slits, were formed in the base material symmetrically with respect to the center line extending in the expansion/contraction direction of the base material.

A slit length a and a slit pitch p of the evaluation samples S1 to S10 were as listed in Table 1.

In addition, an interval b between the slits of the first slit group and the slits of the second slit group was 4 mm for S1 to S3, 6 mm for S4 to S6, and 8 mm for S7 to S9.

TABLE 1

| Sample no. | Slits provided? | Slit length a | Slit pitch p |
|---|---|---|---|
| S1 | Yes | 6 mm | 1 mm |
| S2 | Yes | 6 mm | 2 mm |
| S3 | Yes | 6 mm | 3 mm |
| S4 | Yes | 4 mm | 1 mm |
| S5 | Yes | 4 mm | 2 mm |
| S6 | Yes | 4 mm | 3 mm |
| S7 | Yes | 2 mm | 1 mm |
| S8 | Yes | 2 mm | 2 mm |
| S9 | Yes | 2 mm | 3 mm |
| S10 | No | — | — |

The evaluation samples S1 to S10 manufactured as described above were pulled in the expansion/contraction direction of the base material, and the strain (elongation percentage) with respect to the tensile load was evaluated. The strain is represented as an elongation percentage based on the case where no tensile load is applied to the base material. Specifically, a strain of 100% means that the base material has been stretched to twice the original length.

Figure 9:
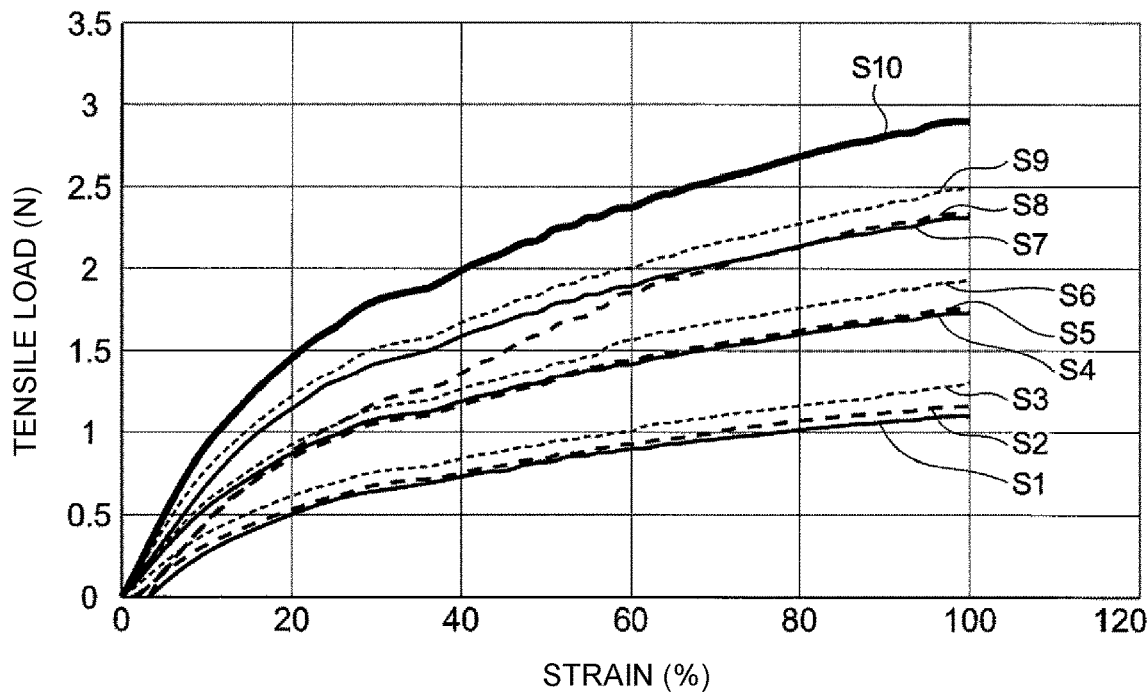
FIG. 9 is a graph illustrating results of confirming an effect obtained when the slit configuration is changed in the evaluation sample illustrated in FIG. 8.

Evaluation results of strain (elongation percentage) with respect to tensile load for evaluation samples S1 to S10 are illustrated in a graph in FIG. 9.

From the evaluation results, it can be understood that the same amount of strain can be obtained with around ⅔ the tensile load as compared with the evaluation sample S10 in which slits are not formed by providing slits a slit length of 4 mm in the first slit group and the second slit group in the base material having a width of 20 mm, that is, by forming slits such that the total slit length of the first slit group and the second slit group is 40% of the width of the base material. It can be further understood that the same amount of strain can be obtained with around half the tensile load as compared with the evaluation sample S10 in which slits are not formed by forming slits such that the total slit length of the first slit group and the second slit group is 60% of the width of the base material.

The strain sensor according to embodiment 1 was manufactured as examples 1 and 2.

Example 1

First, a rectangular base material 101 composed of thermoplastic polyurethane having a width of 10 mm, a length of 50 mm, and a thickness of 40 μm was prepared and the connection terminal conductors 1t, the wiring conductors 1w, and the detection conductors 1d were formed on one main surface thereof (first main surface) as described below. Here, in the strain sensor of example 1, a part extending 36 mm from one end of the base material 101 was used as the first fixing section, a part extending 7 mm from the other end of the base material 101 was used as the second fixing section, and a 7 mm part located between the first fixing section and the second fixing section was used as the measurement section. Furthermore, a 2-mm-wide part located in the center of the measurement section was used as a detection section and 4-mm-wide parts on both sides of the detection section were used as low-elastic-modulus sections.

In addition, the width of the wiring conductors 1w was 1.5 mm and the width of the detection conductors 1d was 0.3 mm. In addition, the length of the detection conductors 1d was 7 mm and the interval between the two detection conductors 1d was 0.6 mm. The wiring conductors 1w and the detection conductors 1d were formed by performing printing with a silver paste containing a silver powder and a thermally curable resin and then curing the resin using heat.

The silts were formed using eleven-row $CO_2$ laser processing with a pitch of 0.5 mm in each low-elastic-modulus section so as to have a length of 3 mm and a width of 0.2 mm. In addition, the slits were each formed such that one end thereof on the side near the detection section reached the boundary between the detection section and the low-elastic-modulus section. In other words, the pitch between the slits of one low-elastic-modulus section and the slits of the other low-elastic-modulus section located in a direction perpendicular to the expansion/contraction direction of the detection conductors was 5 mm. In addition, in the strain sensor of example 1, the first restraining part was formed so as to cover the wiring conductors of the first fixing section and the second restraining part was formed in the second fixing section. The first restraining part and the second restraining part were each formed of UV-curable urethane-modified acrylic resin.

Example 2

A strain sensor of example 2 was manufactured so as to be the same as the strain sensor of example 1 except that the first restraining part of the first fixing section and the second restraining part of the second fixing section of the strain sensor of example 1 were not formed.

Comparative Example 1

A strain sensor of comparative example 1 was manufactured so as to be the same as the strain sensor of example 1 except that the slits, i.e., the low-elastic-modulus sections of the strain sensor of example 1 were not formed.

Comparative Example 2

A strain sensor of comparative example 2 was manufactured so as to be the same as the strain sensor of example 1 except that the first restraining part of the first fixing section and the second restraining part of the second fixing section were not formed and the slits, i.e., the low-elastic-modulus sections were not formed.

The percentage change in resistance with respect to strain was measured for the thus-configured strain sensors of examples 1 and 2 and the comparative examples 1 and 2. The percentage change in resistance with respect to strain in the examples and comparative examples was measured by attaching the strain sensor to a plate-shaped elastomer having rubber elasticity and stretching the elastomer. The results are illustrated in FIG. 10.

Figure 10:
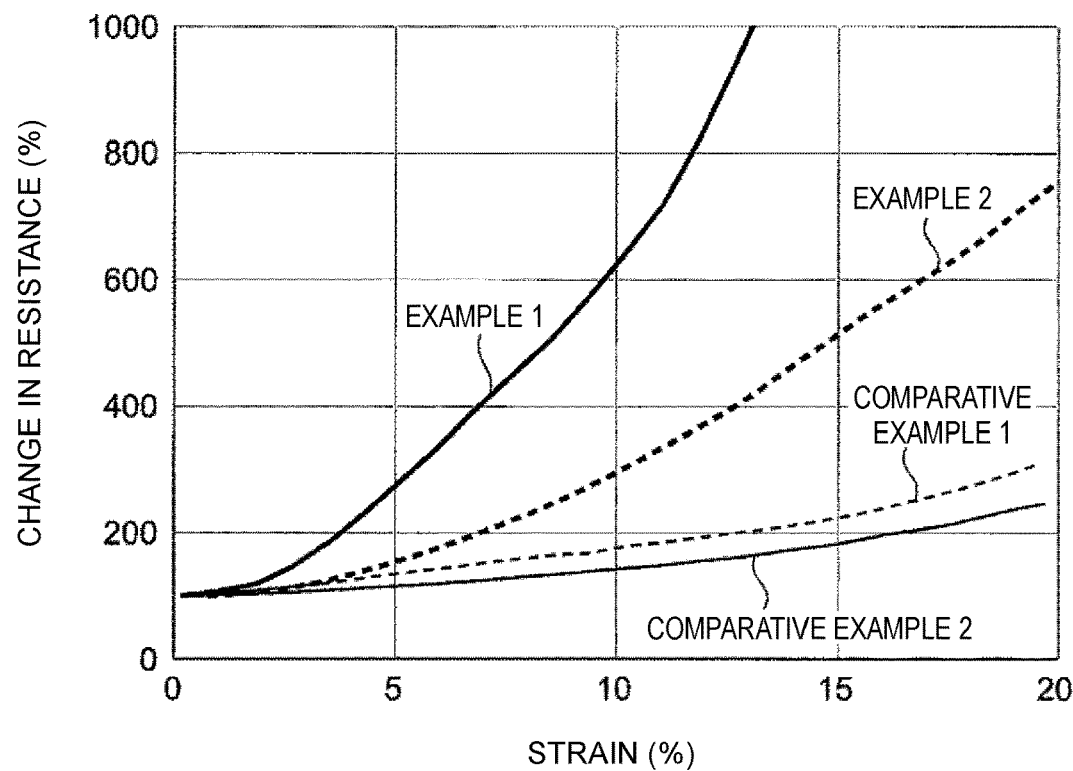
FIG. 10 is a graph illustrating the percentage change of resistance with respect to strain in strain sensors of examples of the present disclosure and strain sensors of comparative examples.

As is clear from FIG. 10, in each of Examples 1 and 2 according to the present disclosure, a percentage change in resistance with respect to strain of at least twice that in Comparative Examples 1 and 2 was obtained.

Furthermore, comparing the strain sensor of comparative example 1 in which the low-elastic-modulus sections (slits) were not formed in the measurement section but the first restraining part was formed in the first fixing section and the second restraining part was formed in the second fixing section and the strain sensor of comparative example 2 in which the low-elastic-modulus sections (slits) were not formed in the measurement section and the restraining parts were not formed in the first fixing section and the second fixing section, there is not a large difference in the percentage change in resistance with respect to strain between the two comparative examples. From these results, it is clear that even if the first fixing section and the second fixing section are provided with restraining parts, unless the low-elastic-modulus sections (slits) are formed in the measurement section, the effect of improving the percentage change in resistance change with respect to strain realized by the restraining part is limited.

In contrast, the percentage change in resistance with respect to strain in the strain sensor of example 1 is at least twice the percentage change in resistance with respect to strain in the strain sensor of example 2. This means that when the first restraining part is formed in the first fixing section and the second restraining part is formed in the second fixing section in addition to the low-elastic-modulus sections (slits) being formed in the measurement section, a very high percentage change in resistance with respect to strain can be obtained due to a synergistic effect.

INDUSTRIAL APPLICABILITY

The strain sensors according to the present disclosure described above can be used in applications where detection of a small strain is required such as detection of a deformation such as local blistering of human skin.

REFERENCE SIGNS LIST 1 conductor section
1*cd*3 third conductor
1*cd*4 fourth conductor
1*cd*5 fifth conductor
1*cd*6 sixth conductor
1*t* connection terminal conductor
1*w* wiring conductor
1*d*, 1*da* detection conductor
1*t*1 to 1*t*6 first to sixth connection terminal conductors
1*w*1 to 1*w*6, 1*w*1*d* to 1*w*6*d* first to sixth wiring conductors
1*d*1 to 1*d*6 first to sixth detection conductors
3, 3-1 to 3-10 slits
20 fixing section
10, 10*a* measurement section
10-1, 10-1*a*, 10-1*b* first measurement section
10-2, 10-2*a*, 10-2*b* second measurement section
10-3, 10-3*a*, 10-3*b* third measurement section
11, 11-1 to 11-6, 11*a* detection section
12, 12-1 to 12-6, 12*a* low-elastic-modulus section
12*a*1 first low-elastic-modulus section
12*a*2 second low-elastic-modulus section
21*a*, 21*b*, 21*c*, 21*d* first fixing section
21*b*0 base fixing part
21*b*1 first branch fixing part
21*b*2 second branch fixing part
21*dc* first wiring fixing section
21*dm* first measurement fixing part
22*a*, 22*b*, 22*c*, 22*d* second fixing section
22*dc* second wiring fixing section
22*dm* second first measurement fixing part
23*b*, 23*c*, 23*d* third fixing section
23*dc* third wiring fixing section
23*dm* third first measurement fixing part
24*b*, 24*c*, 24*d* fourth fixing section
31*a*, 31*c*, 31*d* first restraining part
32*a*, 32*c*, 32*d* second restraining part
33*c*, 33*d* third restraining part
34*b* restraining part
34*c*, 34*d* fourth restraining part
100, 200, 300, 400, 500 strain sensor
101, 201, 301, 401, 501 base material

The invention claimed is:

1. A strain sensor comprising:
a fixing section;
a measurement section that is supported by the fixing section and can expand and contract;
a base material that has a first main surface and a second main surface, which face each other; and
a conductor section provided on the first main surface of the base material;
wherein the conductor section includes a detection conductor that is provided in the measurement section and that has a resistance value that changes in accordance with expansion and contraction of the base material in the measurement section, and
the measurement section includes a detection section in which the detection conductor is provided and a low-elastic-modulus section that increases a deformation amount with respect to an external force in the detection section, wherein the low-elastic modulus section comprises an elastic modulus that is lower than an elastic modulus of the fixing section and/or an elastic modulus of a measurement target region of an object to be measured.

2. The strain sensor according to claim 1,
wherein the low-elastic-modulus section is provided so as to be separate from the detection section.

3. The strain sensor according to claim 2,
wherein the low-elastic-modulus section includes a plurality of slits that are provided in a direction that intersects an expansion/contraction direction of the detection conductor.

4. The strain sensor according to claim 3,
wherein the low-elastic-modulus section is provided between the detection section and the fixing section.

5. The strain sensor according to claim 3,
wherein the low-elastic-modulus section includes a first low-elastic-modulus section that includes one or more of the plurality of slits and a second low-elastic-modulus section that includes one or more of the plurality of slits.

6. The strain sensor according to claim 5,
wherein the detection section is provided between the first low-elastic-modulus section and the second low-elastic-modulus section.

7. The strain sensor according to claim 5,
wherein the slits provided in the first low-elastic-modulus section and the slits provided in the second low-elastic-modulus section are provided in a symmetrical manner in equal numbers and a length that is a sum of slit lengths of two symmetrically provided slits is greater than or equal to 40% of a width of the measurement section.

8. The strain sensor according to claim 1,
wherein the fixing section includes a first fixing section and a second fixing section, and the measurement section is positioned between the first fixing section and the second fixing section.

9. The strain sensor according to claim 2,
wherein the detection section includes a plurality of radial detection sections that are provided in a radiating manner,
the low-elastic-modulus section includes a plurality of fan-shaped low-elastic-modulus sections provided between adjacent radial detection sections, and
the detection conductor is provided in the radial detection sections.

10. The strain sensor according to claim 9,
wherein the plurality of fan-shaped low-elastic-modulus sections include a plurality of slits that are provided in directions that intersect expansion/contraction directions of the detection conductors.

11. The strain sensor according to claim 10,
wherein the low-elastic-modulus sections include a plurality of slits that are provided in a direction that intersects the expansion/contraction direction of the detection conductor, and
the plurality of slits are provided such that slit lengths thereof increase with increasing distance from centers of the fan-shaped low-elastic-modulus sections.

12. The strain sensor according to claim 1,
wherein the conductor section includes a wiring conductor that is connected to the detection conductor and is provided in the fixing section.

13. The strain sensor according to claim 12, wherein a plurality of the measurement sections are provided.

14. The strain sensor according to claim 13,
wherein a part of the wiring conductor connected to the detection conductor provided in one measurement section is disposed in another measurement section, and a change in a resistance value of the detection conductor detected in the one measurement section is calculated on the basis of a change in a resistance value of the detection conductor detected in the other measurement section.

15. The strain sensor according to claim 13,
wherein the plurality of measurement sections includes at least two measurement sections that have different expansion/contraction directions from each other.

16. The strain sensor according to claim 13,
wherein the plurality of measurement sections includes at least two measurement sections that have identical expansion/contraction directions.

17. The strain sensor according to claim 1,
wherein the fixing section includes a restraining part that restrains expansion and contraction of the base material.

18. A method of manufacturing a strain sensor including a fixing section and a measurement section that is supported by the fixing section and can expand and contract, the method comprising:
a step of preparing a base material that has a first main surface and a second main surface, which face each other,
a step of forming a conductor section that includes a detection conductor on the first main surface of the base material, and
a step of forming a low-elastic-modulus section in a part of the measurement section excluding a detection section of the base material.

19. The method of manufacturing a strain sensor according to claim 18,
wherein a plurality of slits are formed in the part of the measurement section excluding the detection section of the base material in the step of forming the low-elastic-modulus section.

20. The method of manufacturing a strain sensor according to claim 18, further comprising:
a step of forming resin, which has a higher hardness than the base material, in the fixing section.

* * * * *